United States Patent [19]

Herweh

[11] 4,438,251

[45] Mar. 20, 1984

[54] POLYURETHANE POLYMERS COMPRISING MACROCYCLIC CROWN ETHERS IN THE POLYMER BACKBONE

[75] Inventor: John E. Herweh, East Hempfield Township, Lancaster County, Pa.

[73] Assignee: Armstrong World Industries, Inc., Lancaster, Pa.

[21] Appl. No.: 494,975

[22] Filed: May 16, 1983

[51] Int. Cl.³ ............................................. C08G 18/32
[52] U.S. Cl. .................................................... 528/73
[58] Field of Search ........................................... 528/73

[56] References Cited

U.S. PATENT DOCUMENTS

| | | | |
|---|---|---|---|
| 3,361,778 | 1/1968 | Pedersen | 252/431 R |
| 3,562,295 | 2/1971 | Pedersen | 549/332 |
| 3,686,225 | 8/1972 | Pedersen | 549/10 |
| 3,687,978 | 8/1972 | Pedersen | 549/10 |
| 3,856,813 | 12/1974 | Pedersen | 549/10 |
| 3,873,569 | 3/1975 | Pedersen | 252/182 |

*Primary Examiner*—Maurice J. Welsh
*Attorney, Agent, or Firm*—Laird F. Miller

[57] ABSTRACT

The present invention relates to polyurethane polymers comprising macrocyclic polyether moieties in the polymer backbone. The polymers may be formed into films which are useful for a variety of purposes.

16 Claims, No Drawings

POLYURETHANE POLYMERS COMPRISING MACROCYCLIC CROWN ETHERS IN THE POLYMER BACKBONE

The present invention relates to polyurethane polymers, and more particularly to polyurethane polymers comprising macrocyclic ether moieties in the polymer backbone.

BACKGROUND OF THE INVENTION

Substantial interest in macrocyclic ethers has developed since their invention was reported by C. J. Pedersen in the late 1960's. Many of these ethers, and in particular those comprising the 18-crown-6 moiety, have proved quite useful in the complexing of alkali metal, alkaline earth and other cations.

THE PRIOR ART

A number of U.S. patents have issued to C. J. Pedersen and co-workers relating to the preparation and use of various crown ethers. For example, U.S. Pat. Nos. 3,361,778; 3,562,295; 3,686,225; 3,687,978; 3,856,813; and 3,873,569 describe a wide variety of crown ethers, azacrown ethers and ionic complexes produced therefrom.

Although certain interest has been shown in developing polymeric materials which comprise crown ethers, the uses for these materials have tended to parallel those of the non-polymerized crown ethers, and little emphasis has been placed on the uniqueness which is attributable to a polymer matrix.

Generally two types of polymers have been produced comprising crown ethers: (1) polymers in which the crown ether moiety was pendant from the polymer backbone; and (2) polymers in which the crown ether moiety was incorporated into the polymer backbone. One example of the latter relates to work wherein a dibenzo-18-crown-6 was nitrated in both benzene rings, and the nitro groups were reduced. The resulting isomeric diamines were then interacted with diacid chlorides to provide polyamides. Other work has also been reported wherein amino groups incorporated into the crown ether moiety itself, i.e., diaza crown ethers, were interacted to form polyureas and polyamides. On the whole, however, polymeric crown ethers have drawn little attention.

Accordingly, one objective of the present invention was to prepare polymeric films comprising crown ether moieties whereby the films would be useful as polymer membranes capable of complexing alkaline earth, alkali metal and other cations.

Another objective of the present invention was to provide polyurethane polymers comprising crown ether moieties in the polymer backbone, the polymers being similarly useful as films suitable for a variety of purposes.

Yet another objective of the present invention was to provide polyurethane polymers comprising crown ether moieties in the polymer backbone whereby, when the crown ethers were complexed with cationic materials or neutral electron acceptor molecules, the polymers would serve as conducting materials.

These and other features of the present invention will become apparent from the detailed description of preferred embodiments which follows.

SUMMARY OF THE INVENTION

The present invention relates to polyurethane polymers comprising macrocyclic polyether moieties in the polymer backbone. The polymers may be formed into films and membranes which are useful for a variety of purposes.

DETAILED DESCRIPTION OF PREFERRED EMBODIMENTS

In one embodiment the present invention relates to polyurethane polymers comprising macrocyclic polyether moieties in the polymer backbone, said polymers being obtained from the reaction of a crown ether of the structure

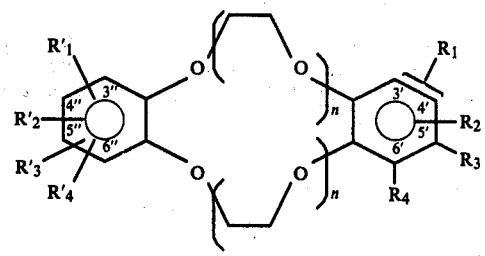

where n=1-3, $R_1$=CHOH—$R_5$, $R_2$, $R_3$, and $R_4$ independently=H or $CH_3$, and $R_5$=H or a straight or branched chain alkyl group having from 1-13 carbon atoms, provided that when $R_1$ is in the 3'-position, $R'_1$ is in the 3''- or 6''-position, and when $R_1$ is in the 4'-position, $R'_1$ is in the 4''- or 5''-position, and further provided that the ring positions of $R'_2$, $R'_3$, and $R'_4$ in relation to $R'_1$ are the same as those of $R_2$, $R_3$ and $R_4$ in relation to $R_1$; and a suitable diisocyanate.

In a second embodiment the present invention relates to a process for preparing polyurethane polymers comprising macrocyclic polyether moieties in the polymer backbone, said process comprising the step of interacting a crown ether of the structure

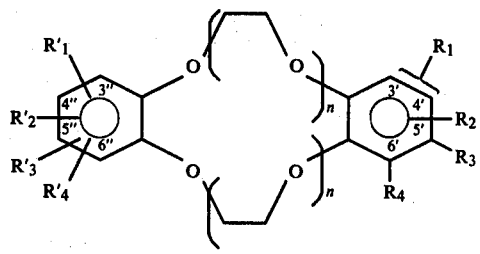

where n=1-3, $R_1$=CHOH—$R_5$, $R_2$, $R_3$, and $R_4$ independently=H or $CH_3$, and $R_5$=H or a straight or branched chain alkyl group having from 1-13 carbon atoms, provided that when $R_1$ is in the 3'-position, $R'_1$ is in the 3''- or 6''-position, and when $R_1$ is in the 4'-position, $R'_1$ is in the 4''- or 5''-position, and further provided that the ring positions of $R'_2$, $R'_3$, and $R'_4$ in relation to $R'_1$ are the same as those of $R_2$, $R_3$ and $R_4$ in relation to $R_1$; and a suitable diisocyanate.

In a third embodiment, the present invention relates to polyurethane polymers comprising macrocyclic polyether moieties in the polymer backbone, said polymers being obtained from the reaction of a crown ether of the structure

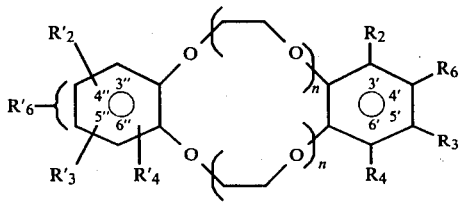

where n=1-3, $R_6$=—$R_7$—CHOH—$R_8$, $R_2$, $R_3$, and $R_4$ independently=H or $CH_3$, $R_7$=—$CH_2$— or —$CH_2CH_2$—, and $R_8$ is a straight or branched chain lower alkyl group having from 1-6 carbon atoms, provided that the ring positions of $R'_2$, $R'_3$, and $R'_4$ in relation to $R'_1$ are the same as those of $R_2$, $R_3$, and $R_4$ in relation to $R_1$; and a suitable diisocyanate.

In a fourth embodiment, the present invention relates to a process for preparing polyurethane polymers comprising macrocyclic polyether moieties in the polymer

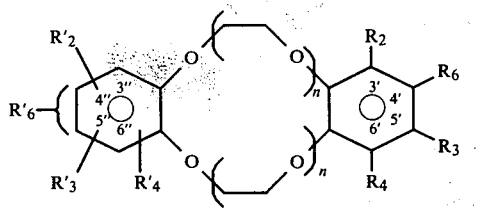

backbone, said process comprising the step of interacting a crown ether of the structure where n=1-3, $R_6$=$R_7$—CHOH—$R_8$, $R_2$, $R_3$ , and $R_4$ independently=H or $CH_3$, $R_7$=—$CH_2$— or —$CH_2CH_2$—, and $R_8$ is a straight or branched chain lower alkyl group having from 1-6 carbon atoms, provided that the ring positions of $R'_2$, $R'_3$, and $R'_4$ in relation to $R'_1$ are the same as those of $R_2$, $R_3$, and $R_4$ in relation to $R_1$; and a suitable diisocyanate.

The polyether ring system used to practice the present invention will preferably comprise a diphenylene-18-crown-6 moiety (where n=2); however it may also comprise diphenylene-12-crown-4 moieties (where n=1) and diphenylene-24-crown-8 moieties (where n=3).

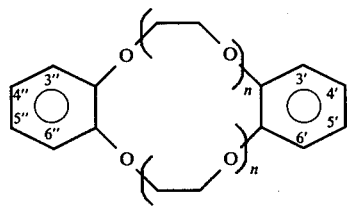

The 18-crown-6 moiety is preferred because of its ability to complex a great many cationic materials.

The polyether diols comprising these moieties may be prepared by means which are well known in the art. For example, 3,4-dihydroxybenzaldehyde (a substituted catechol) may be interacted with bis(2-chloroethyl)ether according to general literature procedures to provide a 2,3:11,12-bis[4',4"'(or 5")-formylbenzo]-18-crown-6 product. Similarly, if 1,2-dichloroethane or 1,2-bis(2-chloroethoxy)ethane is substituted for the bis(2-chloroethyl)ether, the 12-crown-4 or 24-crown-8 moiety, respectively, can be obtained. The aldehydes can then be reduced to the diol form.

When the substituted catechol is interacted to form the crown ether ring system, an isomeric mixture is obtained because the dihydroxy phenylene ring can interact with the chloro compounds to form syn- and anti-isomers. The present invention may be practiced using either the isomeric mixture or the pure isomers, depending on the desires of the artisan.

A variety of hydroxylated ring substituents can be prepared for use according to the present invention. These materials are derivable from aldehydes and ketones which are commercially available, or which are prepared according to literature methods. Primary alcohols may be prepared by reacting catechol aldehydes of the formula

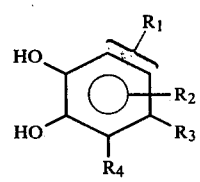

where $R_1$ is —$COR_5$, $R_2$, $R_3$, and $R_4$ are independently H or $CH_3$, and $R_5$ is H, and then reducing the aldehyde to the alcohol after interaction of the catechol to form the crown ether. Similarly, secondary alcohols on the carbon adjacent the ring may be prepared by reacting catechol ketones of the same formula wherein $R_5$ is a straight or branched chain alkyl group having from 1 to 13 carbon atoms. As another alternative, however, 4-position ketones may be prepared by first forming the crown ether and then acylating the rings in the 4'- and 4"- (or 5") positions. The various alcohols may then be prepared by reduction using, for example, sodium borohydride.

As yet another alternative, secondary alcohols may be prepared by reacting a 4-position substituted catechol of the formula

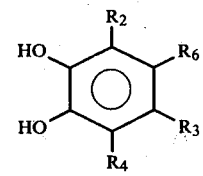

where $R_2$, $R_3$ , and $R_4$ are as previously described, $R_6$=—$R_7COR_8$, $R_7$=—$CH_2$— or —$CH_2CH_2$—, and $R_8$=a straight or branched chain lower alkyl group having from 1-6 carbon atoms. As before, the ketone may similarly be reduced to provide the desired secondary alcohol.

The novel polyurethane polymers of the present invention are derived from the crown ether diols and suitable diisocyanates. A wide range of diisocyanates will be found satisfactory to practice the present invention, examples of which are 2,4-toluene diisocyanate, hexamethylene diisocyanate, 4,4'-methylene-bisphenylene diisocyanate, and methylene bis(4-cyclohexyl isocyanate). It is emphasized, however, that these diisocyanates are referred to by way of illustration and not limitation, and that many other diisocyanates will provide suitable results.

The polymerization can be conveniently achieved by dissolving the diol in an appropriate solvent under an inert atmosphere, and interacting it with a suitable diisocyanate in a manner which is generally applicable to the preparation of polyurethane polymers.

The ease of reaction, however, may depend on the nature of the diol. For example, unhindered diols (such as diol IIIa) will readily to form the desired polymer, whereas hindered secondary benzylic diols (such as diol IIIQ) tend to react quite slowly. The reason for this is unclear, although it is probably attributable to the enhanced acidity of the benzylic alcohol group brought about by the presence of the adjacent alkyl group.

In addition to reacting only the crown-ether diols with diisocyanates, these diols may also be intermixed with unrelated diols such as polypropylene glycol, trimethylene glycol, triethylene glycol, tetramethylene glycol, neopentylene glycol, hexamethylene glycol, decamethylene glycol, and the like, to provide polymers having a limited crown ether content. This procedure is useful in order to modify the physical characteristics of the resulting polymers such that certain beneficial properties are enhanced. For example, several of the polymers prepared from the pure crown ether diols have tended to be very tough and difficult to handle whereas, when the amount of extraneous diol was increased to the point where it constituted the vast majority of total diol, the polymers tended to be very flexible. Nevertheless, the nature of the product will also be affected by the ease with which the crown ether diol reacts. For example, diols which are slow to react with the diisocyanate will be more amenable to the formation of block copolymers with the extraneous diols. On the other hand, crown ether diols which readily react are more amenable to the production of fairly homogeneous polymers. Accordingly, by varying the materials which are interacted, the present invention provides a way in which the artisan can select the properties which are desired in the product.

The advantages and utilities of the present invention will become apparent by reference to the examples which follow. These examples are intended by way of illustration and not be way of limitation. For convenience, only the 18-crown-6 ring is illustrated.

EXAMPLES

A diformyl benzo-18-crown-6 ether is prepared essentially as described by C. J. Pedersen in Organic Synthesis, H.O. House, Ed., J. Wiley and Sons, Inc. 1972, Volume 52, p. 66. The reaction sequence may be visualized by reference to the following scheme:

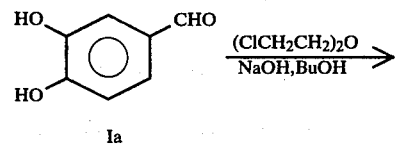

Ia

-continued

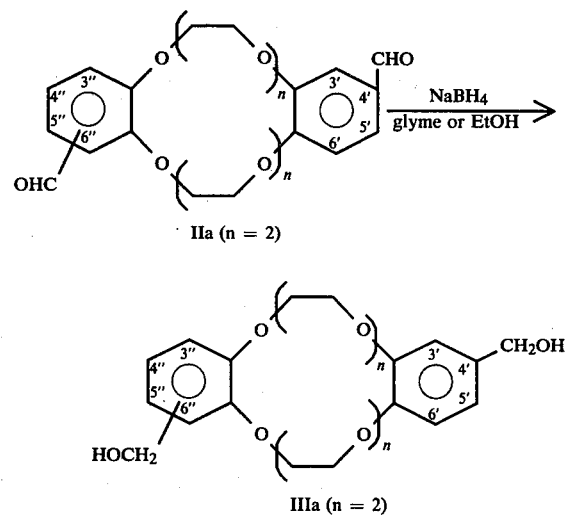

IIa (n = 2)

IIIa (n = 2)

EXAMPLE 1

Preparation of Crown Ether Aldehyde

A sample of 3,4-dihydroxybenzaldehyde (Ia) is prepared by means well known in the art. A solution of 69.06 grams (0.05 mol) of this compound in 900 ml of 1-butanol is sparged with nitrogen for ½ hour and 20.34 grams (0.508 mol) of sodium hydroxide pellets is quickly added. The pale amber reaction mixture is rapidly heated to reflux under nitrogen and 36.97 grams (0.26 mol) of bis(2-chloroethyl)ether is added over a period of two hours.

Refluxing is continued for an additional 30 minutes after the addition is complete, and the reaction mixture is then cooled to 90° C. A second charge of 20.34 grams ((0.508 mol) of sodium hydroxide pellets is quickly added, and the reaction mixture is again heated to reflux. A second portion of 36.97 grams (0.26 mol) of bis(2-chloroethyl) ether is added over a second 2-hour period, and, when addition is complete, the reaction mixture is heated at reflux for 16 hours. Upon cooling to room temperature, the reaction mixture is acidified with concentrated hydrochloric acid. Approximately 400 ml of 1-butanol is distilled from the reaction mixture, at which point water is added drop-wise to the distillation at a rate equal to that of distillate formation. When the temperature of the distillate reaches 97° C., distillation is discontinued. The volume of the collected distillate is about 1500 ml.

The two-phase reaction mixture remaining in the flask is cooled to room temperature and 100 ml of acetone is added, causing a precipitate to form. The acetone-water phase is decanted and the residual dark brown sludge is repeatedly triturated with 250-ml portions of acetone. This treatment transforms the sludge into a pale brown filterable solid. The solid filter cake is washed with ether and dried in vacuo to give 29.7 grams of 2,3:11,12-bis[4',4"(or 5")-formylbenzo]-18-crown-6 (IIa), melting point 210°-217° C. An analytical sample, melting point 206°-209° C., is obtained by recrystallization of the crude product from tetrahydrofuran. The product of this reaction is a mixture of syn- and anti-isomers analagous to those reported by Pedersen for other disubstituted dibenzo-18-crown-6 polyethers.

Subjection of each of the following compounds to these conditions provides a substituted crown ether diketone or dialdehyde.

| | 3 |
|---|---|

HO, 3, 4, 5, HO, 6 (structure)

| | | Substituent | | |
|---|---|---|---|---|
| Compound | 3-Pos. | 4-Pos. | 5-Pos. | 6-Pos. |
| Ia | H | CHO | H | H |
| Ib | H | CHO | CH3 | H |
| Ic | CHO | CH3 | H | H |
| Id | CHO | H | CH3 | CH3 |
| Ie | H | COCH3 | H | H |
| If | CH3 | COCH3 | H | H |
| Ig | CH3 | COCH3 | CH3 | H |
| Ih | COCH3 | H | H | H |
| Ii | COCH3 | H | H | CH3 |
| Ij | CO(CH2)3CH3 | H | CH3 | H |
| Ik | H | CH2COCH3 | H | H |
| Im | H | (CH2)2COCH3 | H | H |

EXAMPLE 2

Acylation of Crown Ethers

Acylated crown ethers are prepared as described by P. E. Stott et al. in J. Org. Chem., 45, 4716 (1980). Representative products are as follows:

(structure)

| | Substituent | | | |
|---|---|---|---|---|
| Compound | R2 | R3 | R4 | R5 |
| IIn | H | H | H | CH3 |
| IIo | CH3 | H | H | CH2CH3 |
| IIp | CH3 | H | H | (CH2)8CH3 |
| IIq | H | H | H | (CH2)3CH3 |

EXAMPLE 3

Preparation of Diols

Reduction of each of the ketones or aldehydes IIa–q to the corresponding alcohol IIIa–q is accomplished by reduction with sodium borohydride essentially as described in the organic literature. A stirred slurry of 2.0 grams (0.0048 mol) of the diformyl compound (IIa) and 75 ml of glyme is treated with 0.36 grams (0.0095 mol) of sodium borohydride at room temperature. After stirring for approximately 68 hours, the reaction mixture is poured into 100 ml of water. The resulting mixture is neutralized with dilute acetic acid, with cooling. The neutralized mixture is then concentrated at reduced pressure to approximately ¾ of its original volume and, after cooling the resulting concentrate to room temperature, it is extracted four times with 25-ml portions of methylene chloride. The combined extracts are concentrated to dryness leaving the crude crown ether diol (IIIa) which may be purified by crystallization. Representative diols are as follows, where the 3′, 4′, 5′, and 6′ substitutions are indicated, and the 3″, 4″, 5″, and 6″ positions are substituted as syn- or anti-isomers.

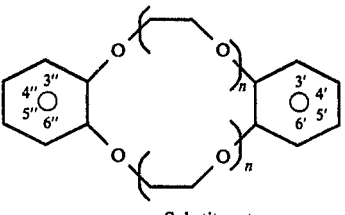

| | | Substituent | | |
|---|---|---|---|---|
| Compound | 3′-Pos. | 4′-Pos. | 5′-Pos. | 6′-Pos. |
| IIIa | H | CH2OH | H | H |
| IIIb | H | CH2OH | CH3 | H |
| IIIc | CH2OH | CH3 | H | H |
| IIId | CH2OH | H | CH3 | CH3 |
| IIIe | H | CHOHCH3 | H | H |
| IIIf | CH3 | CHOHCH3 | H | H |
| IIIg | CH3 | CHOHCH3 | CH3 | H |
| IIIh | CHOHCH3 | H | H | H |
| IIIi | CHOHCH3 | H | H | CH3 |
| IIIj | CHOH(CH2)3CH3 | H | CH3 | H |
| IIIk | H | CH2CHOHCH3 | H | H |
| IIIm | H | (CH2)2CHOHCH3 | H | H |
| IIIn | H | CHOHCH3 | H | H |
| IIIo | CH3 | CHOHCH2CH3 | H | H |
| IIIp | CH3 | CHOH(CH2)8CH3 | H | H |
| IIIq | H | CHOH(CH2)3CH3 | H | H |

EXAMPLE 4

Polymerization of Crown Ether Diols

The following example will illustrate the preparation of polyurethane polymers bearing the dibenzo-18-crown-6 moiety in the backbone. A mixture of 4.2 grams of dibenzo-18-crown-6 diol IIIa (0.01 mol) in 40 ml of dimethyl formamide is charged into a reactor and the stirred mixture is warmed under a nitrogen atmosphere to effect solution. A quantity of 40 ml of xylene is added and the homogeneous reaction mixture is heated to reflux, causing approximately 8.5 ml of an azeotrope to distill. The clear pale yellow reaction solution is cooled to 60° C. and 0.01 gram of dibutyl tin bis(dodecylthiolate) catalyst is added, followed by a slight molar excess of diisocyanate. For purposes of this illustration, methylene bis(4-cyclohexyl isocyanate) is used. The reaction mixture is heated to 90° C. and maintained for 4.5 hours, after which the reaction mixture is sampled for the presence isocyanate by infrared analysis. When approximately 90% of the starting isocyanate has reacted, 0.01 ml of water is added and the reaction mixture is heated at approximately tely 90° C. for an additional 2.5 hours to induce chain extension via the isocyanate-water reaction. Upon cooling to room temperature, the reaction mixture is allowed to stand for approximately 16 hours to produce an off-white gel-like precipitate. The fluid is decanted and the spongy mass is triturated with ether, and then dried in vacuo. The crude product is dissolved in chloroform and the slightly turbid, yellow solution is filtered through nylon to remove any gel-like particles. The filtrate is treated with 600 ml of hexane to precipitate a fluffy fibrous white solid which is filtered and dried.

EXAMPLE 5

Polymerization of Hindered Crown Ether Diols

The following example will illustrate the preparation of polyurethane polymers using a hindered benzylic diol and either an aromatic or non-aromatic diisocyanate.

A mixture of 10.65 grams of dibenzo-18-crown-6 diol IIIq (0.02 mol) in 144 ml of 1:1 dry dimethyl formamide/xylene containing 0.01 grams of dimethyl tin bis(neodecanoate) catalyst is charged into a reactor along with 3.57 grams of 2,4-toluene diisocyanate (0.0205 mol), an aromatic diisocyanate. The reaction mixture is heated at 80° C. for approximately 4.5 hours, during which time a significant portion of the diisocyanate reacts. A 0.2-ml volume of water is added and heating is continued at 80° for 2.5 hours to induce chain extension. After cooling, the reaction mixture is poured into 900 ml of hexane to precipitate an oil. The oil is separated, triturated with hexane, after which the hexane is evaporated under reduced pressure to provide a viscous oil. Upon treatment of the oil with water, a cream-colored solid is obtained which is filtered, washed and dried.

When the above reaction procedure is repeated using the same components, but substituting 5.38 grams (0.0205 mol) of methylene bis(4-cyclohexyl isocyanate), a non-aromatic diisocyanate, no reaction is obtained until the reaction temperature is increased to 120° C. The reaction mixture is heated for four hours at 120° C., cooled to 90° C., and an additional 0.01 grams of catalyst is added. Following addition of the additional catalyst, heating is continued for another 16 hours. Upon workup as described above, a cream-colored solid is similarly obtained. In comparison to Example 4, diol IIIq reacted very slowly.

Both solids may be melt pressed to give hard brittle films; however, the characteristics of both materials indicate that they are of low molecular weight. This is not unexpected in view of the difficulty in inducing the reaction.

EXAMPLE 6

This example will illustrate the preparation of polymeric films using crown ether diols and unrelated diols. The sequence described in Example 4 is repeated by substituting an unrelated diol, such as polypropylene glycol, for a portion of the crown ether diol. Examples of materials which can be produced in this fashion are as follows, crown 6A being derived from the pure crown ether diol (IIIa).

| Polymer | Molar Amounts of Reactants | | | Mol Ratio CED/PPG | Solvent (ml DMF- ml Xylene) |
|---|---|---|---|---|---|
| | CED[a] (mmol) | PPG[b] (mmol) | diisocyanate (mmol) | | |
| 6A | 10 | — | 10.25 | 1/0 | (40–40) |
| 6B | 15 | 5 | 20.50 | 3/1 | (60–60) |
| 6C | 10 | 10 | 20.50 | 1/1 | (40–80) |
| 6D | 5 | 15 | 20.50 | 1/3 | (20–100) |

[a]CED = crown ether diol
[b]PPG = polypropylene glycol

These films may be cast from halohydrocarbon lacquers or melt pressed to provide transparent films which decrease in toughness from film 6A (which is quite tough and inflexible) to film 6D (which is relatively soft and flexible). Film 6D demonstrates a tensile strength of 1913 pounds per square inch and an elongation of 231.3 percent as compared to film 6A which tends to be brittle. Glass transition temperature ($T_g$) determinations using differential scanning caliometry (DSC) or reovibron apparatus show $T_g$'s of 120° C., 92° C., 42° C. and 15° C. for films 6A through 6D, respectively. These measurements also show that film 6A is a single phase, relatively homogeneous film; film 6B is a two-phase system with a shift toward heterogeneity; film 6 shows pronounced heterogeneity; and film 6D shows a shift away from the multiphase curve. All of these films, which comprise the 18-crown-6 moiety, are effective in complexing potassium ion and, to a lesser extent, sodium ion. The films are also effective in forming electron donor-acceptor complexes with neutral acceptor species, as illustrated in Example 8.

EXAMPLE 7

This example is comparable to Example 6D, except that polyethylene glycol is substituted for polypropylene glycol. The reaction sequence is carried out essentially as described in Example 4 and, upon addition of 900 ml of hexane to the gelatinous material obtained upon cooling the reaction mixture, a cream-colored spongy solid is obtained. Upon triturating the solid with hexane, a material is obtained which has a Tg of 17° C., and which demonstrates physical characteristics comparable to those of polymer 6D.

EXAMPLE 8

This example will illustrate the ability of the polymers of the present invention to form electron donor-acceptor complexes with various species. The complexes may be formed in a variety of ways. In one method, the polymer and TCNQ (7,7,8,8-tetracyanoquinodimethane), in mole ratios from 1:1 to 6:1, are dissolved in a halohydrocarbon such as chloroform. The absorption spectrum of this solution, which tends to be greenish in color, shows a broad band from about 480 to greater than 750 nm. Neither the polymer nor TCNQ show absorbance in this region. Upon removal of the solvent, greenish-colored films can be formed in the usual manner.

Another method of complex formation is to dope solvent-cast or melt-pressed films by immersing them for up to ¾ hour in solutions containing TCNQ. Suitable solvents for this purpose are tetrahydrofuran/1,2-dichloroethane, ranging from a ratio of 4:1 to 3:2 parts by volume, and acetonitrile/1,2-dichloroethane in similar proportions.

EXAMPLE 9

This example will illustrate the ability of the polymers of the present invention to solubilize certain solid salts. As one example, a solid salt of TCNQ anion radical (K+TCNQ–·), which is copper to red in color, is contacted with a chloroform solution of crown ether polymer. The maximum absorbance of the solution occurred after 48 hours contact, and the various spectra showed strong absorption in the 400–900 nm region, with maxima at about 420 and 840 nm. These maxima correspond to the maxima of the TCNQ anion radical.

The polymer is also effective in solubilizing other solid salts when the polymer is dissolved in a solvent. For example, when film 6D is prepared in an 8 percent concentration in chloroform and a 10-gram quantity of lacquer is stirred with 1 gram of solid potassium thiocyanate for 40 minutes, a 1-mil film cast from the chloroform solution or pressed from the solid material shows a significant increase in $T_g$ (mid-range). Thus, a film cast from the 8 percent solution shows a $T_g$ of 35° C. whereas the film obtained after extraction of the potassium thiocyanate shows a $T_g$ of 49° C. The same increase is not apparent when the above solution is used to extract other solid substances such as KCl (38°), KBr (26°), or KI (20°).

My invention is not restricted solely to the descriptions and illustrations provided above, but encompasses all modifications envisaged by the following claims.

What is claimed is:

1. Polyurethane polymers comprising macrocyclic polyether moieties in the polymer backbone, said polymers being obtained from the reaction of
   (a) a crown ether of the structure

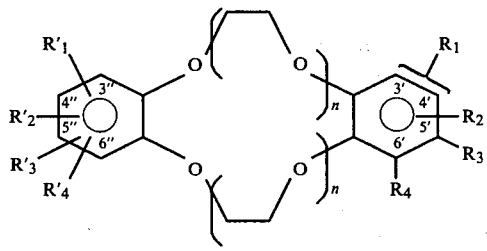

where $n=1-3$; $R_1=$—CHOHR$_5$, $R_2$, $R_3$, and $R_4$ independently$=$H or CH$_3$, and $R_5=$H or a straight or branched chain alkyl group having from 1-13 carbon atoms; provided that when $R_1$ is in the 3'-position, $R_1'$ is in the 3"- or 6"-position, and when $R_1$ is in the 4-position, $R_1'$ is in the 4"- or 5"-position, and further provided that the ring positions of $R_2'$, $R_3'$, and $R_4'$ in relation to $R_1'$ are the same as those of $R_2$, $R_3$ and $R_4$ in relation to $R_1$; and
   (b) a suitable diisocyanate.

2. The invention as set forth in claim 1 hereof wherein said crown ether comprises an unrelated diol.

3. The invention as set forth in claim 1 hereof wherein $n=2$.

4. The invention as set forth in claim 3 hereof wherein said crown ether comprises an unrelated diol.

5. A process for preparing polyurethane polymers comprising macrocyclic polyether moieties in the polymer backbone, said process comprising the interaction of
   (a) a crown ether of the structure

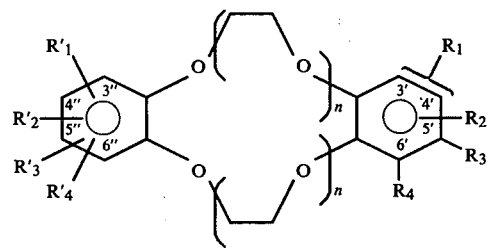

where $n=1-3$; $R_1=$—CHOHR$_5$, $R_2$, $R_3$, and $R_4$ independently$=$H or CH$_3$, and $R_5=$H or a straight or branched chain alkyl group having from 1-13 carbon atoms; provided that when $R_1$ is in the 3'-position, $R_1'$ is in the 3"- or 6"-position, and when $R_1$ is in the 4'-position, $R_1'$ is in the 4"- or 5"-position, and further provided that the ring positions of $R_2'$, $R_3'$, and $R_4'$ in relation to $R_1'$ are the same as those of $R_2$, $R_3$ and $R_4$ in relation to $R_1$.
   (b) a suitable diisocyanate.

6. The invention as set forth in claim 5 hereof wherein said crown ether comprises an unrelated diol.

7. The invention as set forth in claim 5 hereof wherein $n=2$.

8. The invention as set forth in claim 7 hereof wherein said crown ether comprises an unrelated diol.

9. Polyurethane polymers comprising macrocyclic polyether moieties in the polymer backbone, said polymers being obtained from the reaction of a crown ether of the structure

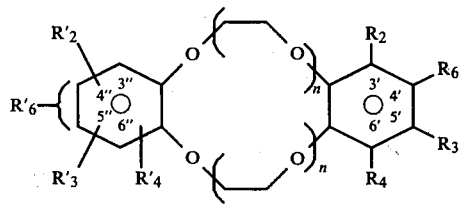

where $n=1-3$; $R_6=$—R$_7$—CHOH—R$_8$, $R_2$, $R_3$, and $R_4$ independently$=$H or CH$_3$, $R_7=$—CH$_2$— or —CH$_2$CH$_2$—, and $R_8$ is a straight or branched chain lower alklyl group having from 1-6 carbon atoms, provided that the ring positions of $R_2'$, $R_3'$ and $R_4'$ in relation to $R_1'$ are the same as those of $R_2$, $R_3$, and $R_4$ in relation to $R_1$; and a suitable diisocyanate.

10. The invention as set forth in claim 9 hereof wherein said crown ether comprises an unrelated diol.

11. The invention as set forth in claim 9 hereof wherein $n=2$.

12. The invention as set forth in claim 11 hereof wherein said crown ether comprises an unrelated diol.

13. A process for preparing polyurethane polymers comprising macrocylic polyether moieties in the polymer backbone, said process comprising the step of interacting a crown ether of the structure

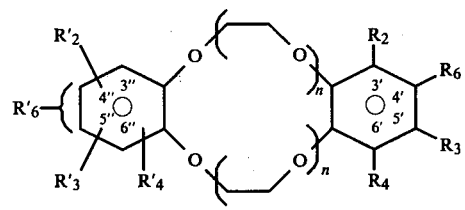

interacting a crown ether of the structure where $n=1-3$; $R_6=$—R$_7$—CHOH—R$_8$, $R_2$, $R_3$, and $R_4$ independently$=$H or CH$_3$, $R_7=$—CH$_2$— or —CH$_2$CH$_2$—, and $R_8$ is a straight or branched chain lower alklyl group having from 1-6 carbon atoms, provided that the ring positions of $R_2'$, $R_3'$, and $R_4'$ in relation to $R_1'$ are the same as those of $R_2$, $R_3$, and $R_4$ in relation to $R_1$; and a suitable diisocyanate.

14. The invention as set forth in claim 13 hereof wherein said crown ether comprises an unrelated diol.

15. The invention as set forth in claim 13 hereon wherein $n=2$.

16. The invention as set forth in claim 15 hereof wherein said crown ether comprises an unrelated diol.

* * * * *